United States Patent [19]

Matsumoto et al.

[11] Patent Number: 5,642,181
[45] Date of Patent: Jun. 24, 1997

[54] IMAGE EXPOSURE APPARATUS

[75] Inventors: Toshiya Matsumoto, Kawasaki; Yukuo Yamaguchi, Tokyo; Katsuhiko Okitsu; Taketo Ochiai, both of Yokohama, all of Japan

[73] Assignee: Canon Kabushiki Kaisha, Tokyo, Japan

[21] Appl. No.: 388,509

[22] Filed: Feb. 14, 1995

[30] Foreign Application Priority Data

Feb. 15, 1994 [JP] Japan .................................. 6-039291

[51] Int. Cl.⁶ .......................... G03B 27/52; G03B 13/28; G03C 13/24
[52] U.S. Cl. .................................. 355/45; 355/44
[58] Field of Search ........................ 355/43, 44, 45, 355/64, 65, 66; G03B 13/28, 21/11, 27/52, 27/70, 13/24, 13/26, 27/32; G03G 15/04

[56] References Cited

U.S. PATENT DOCUMENTS

| | | | |
|---|---|---|---|
| 488,605 | 12/1892 | Fujita et al. | 355/41 |
| 4,589,767 | 5/1986 | Yanagi et al. | 355/45 |
| 4,751,553 | 6/1988 | Fukasawa | 355/45 |
| 4,864,359 | 9/1989 | Yamasaki et al. | 355/51 |
| 4,947,213 | 8/1990 | Murata et al. | 355/271 |
| 4,958,186 | 9/1990 | Sashida | 355/41 |
| 5,020,900 | 6/1991 | Sashida et al. | 353/26 R |
| 5,151,593 | 9/1992 | Masuda | 250/234 |
| 5,153,697 | 10/1992 | Nanba et al. | 355/45 |
| 5,365,307 | 11/1994 | Sugiyama | 355/45 |
| 5,376,987 | 12/1994 | Onuki | 355/45 |

Primary Examiner—Arthur T. Grimley
Assistant Examiner—Herbert V. Kerner
Attorney, Agent, or Firm—Fitzpatrick, Cella, Harper & Scinto

[57] ABSTRACT

An image exposure apparatus switchable between a reader state for projecting an image on a screen for observation and a scan state for scanning exposure of the image, which includes plural scanning mirrors which integrally move on a same line to effect the image scanning. The mutual distance of the plural scanning mirrors is varied at the switching between the reader state and the scan state.

21 Claims, 6 Drawing Sheets

FIG. 11
PRIOR ART
READER MODE

FIG. 12
PRIOR ART
PRINT MODE

IMAGE EXPOSURE APPARATUS

BACKGROUND OF THE INVENTION

1. Field of the Invention

The present invention relates to an image exposure apparatus which is switchable between a reader state in which an image is projected on a screen for observation and a scan state in which the image is subjected to scanning exposure.

2. Related Background Art

Figure 11:
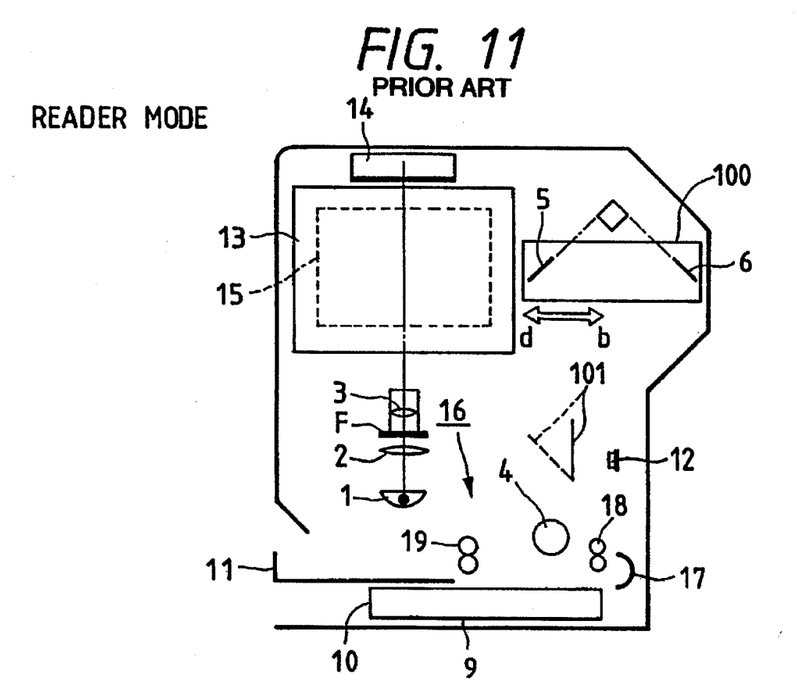
FIG. 11 is a schematic view of a conventional apparatus in the reader mode.
Figure 12:
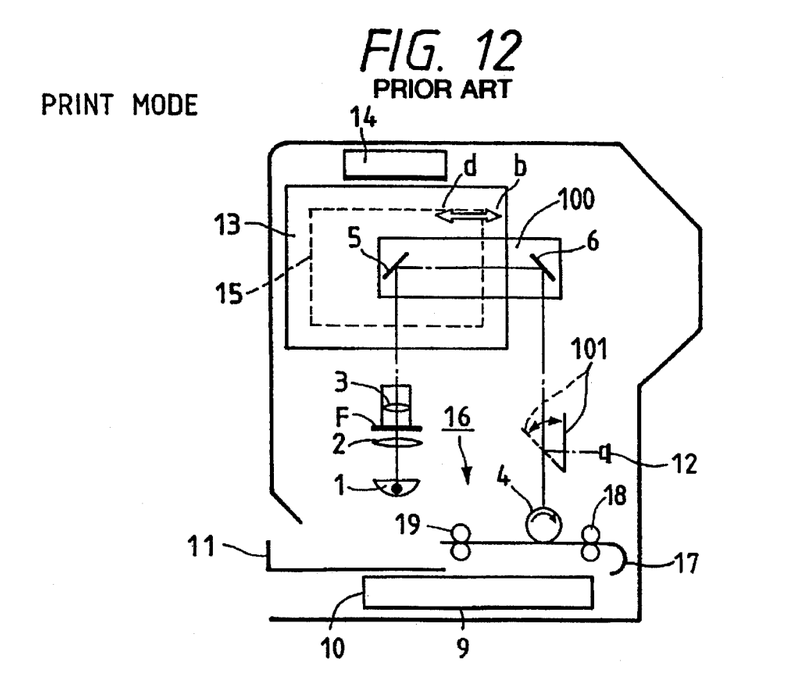
FIG. 12 is a schematic view of said apparatus in the print mode.

In such field there is already known a microfilm reader-printer, which has a reader function for magnified projection of an image of a microfilm on a screen for direct observation, and a print function for producing a reproduced print of the image. FIGS. 11 and 12 are schematic views of an example of such reader-printer, respectively in the reader mode and in the print mode.

A film illuminating unit is comprised of an illuminating lamp 1 and a condensing lens 2, and a desired image frame of a microfilm F is retrieved and positioned at a film illuminating position above said condensing lens 2.

The light transmitted by the film F enters a projection lens 3 and, in the reader mode shown in FIG. 11, the light transmitted by the projection lens 3 is guided by a first reader mirror 14 and a second reader mirror 15 to the internal face of a reader screen 13, provided at the front portion of the apparatus, whereby the image information of the image frame of the microfilm, placed at the film illuminating position, is projected in magnified manner onto said screen 13 and said magnified projected image can be observed from the external side of the screen 13. The first reader mirror 14 of the reader system is provided at the top side of the apparatus while the second reader mirror 15 is provided at the rear side of the apparatus, so that a 4-shaped reader optical path is formed when seen from the left side of the apparatus.

First and second scanning mirrors 5, 6 are supported by a common scanning case 100, with a predetermined mutual distance and in respectively downward positions inclined by 45° in such a manner that the extensions of the reflecting faces mutually cross perpendicularly.

Said scanning case 100 can reciprocate in the horizontal direction, as indicated by an arrow d-b, along a guide member and under the function of drive means controlled by control means (not shown). The first and second reader mirrors 14, 15 and the screen 13 are positioned outside the moving path of the scanning case 100.

In the reader mode, said scanning case 100 is moved in the forward direction b to a right-hand end point in the apparatus and remains in a reader position (home position) at the right-hand side of the apparatus, outside the optical path (reader optical path) between the projection lens 3 and the first reader mirror 14 of the reader system, as shown in FIG. 11.

A print mechanism 16 provided in the lower part of the apparatus is comprised, in this example, of a transfer electrophotographic copying mechanism. There is provided a rotating electrophotographic photosensitive drum 4, around which are provided already known image forming process means such as a charger, a developing unit, a transfer unit and a cleaning unit (said means being omitted from the illustration). There are also provided a sheet cassette 10, copy sheets 9 stacked on said cassette 10, a sheet guide member 17, paired transport rollers 18, 19 and a sheet discharge tray 11.

When a copy button (not shown) is depressed in the reader mode shown in FIG. 11, the control system of the apparatus is switched to the print mode to activate the print mechanism 16 thereby clockwise rotating the photosensitive drum 4 with a predetermined process (peripheral) speed. Also the scanning case 100 effects a forward movement (back scan) d from the reader position to the left, with a predetermined controlled speed. As a result of said forward movement d of the scanning case 100, the first scanning mirror 5 enters and moves, as shown in FIG. 12, in the reader optical path between projection lens 3 and the first reader mirror 14 of the reader system. The second scanning mirror 16 is positioned above the photosensitive drum 4 of the print mechanism 16.

After the forward movement d of the scanning case 100 by a predetermined distance, it is shifted to a reverse movement b to the right, and the reversing speed of said scanning case 100 is controlled at ½ of the peripheral speed of the photosensitive drum 4 of the print mechanism 16.

By said reversing movement b of the scanning case 100, the above-mentioned reader optical path is scanned by the first scanning mirror 5, and the scanned light is reflected by the first and second scanning mirrors 5, 6 and irradiates, as a slit, the rotary photosensitive drum 4 (image exposure), whereby the print mechanism 16 forms an enlarged print of the image information of the image frame of the microfilm F. After the completion of image exposure on the photosensitive drum 4, the scanning case 100 continues the reverse movement b to the original reader position, whereupon the apparatus returns to the reader mode.

The length of the reader optical path from the projection lens 4 through the first and second reader mirrors 14, 15 to the screen 13 in the reader mode is the same as that of the scanning optical path from the projection lens 3 through the first and second scanning mirrors 5, 6 to the exposed portion of the photosensitive drum 4.

In most of the apparatus of the above-explained kind, the reproduced print is obtained by the known electrophotographic process utilizing slit exposure on a photosensitive drum as explained in the foregoing example, but for responding to the recent requirements for diversified functions in such apparatus, there is often added a function of reading the image information by the use of an image pick-up device such as CCD in addition to the photosensitive drum 4. There are also known apparatus capable, based on the read image information, of effecting AE (automatic image density control) or image processing such as black frame erasing at the formation of reproduction print by the photosensitive drum 4, and of recording the read image information for example in a magnetooptical disk.

In such apparatus, there is also known the simplification of the configuration by utilizing the scanning optical path for the aforementioned reproduction print, also in the reading of the image information. More specifically, as shown in FIGS. 11 and 12, a rocking mirror 101 for switching the optical path is provided immediately in front of the exposure portion of the photosensitive drum 4 and the image is focused on a one-dimensional photosensor array positioned on thus branched optical path, whereby the image information can be read.

In such case, the length of the optical path from the projection lens 3 through the first and second scanning mirrors 5, 6 and the rocking mirror 101 to the photosensor array 12 is the same as that of the reader optical path in the aforementioned reader mode or that of the scanning optical path in the aforementioned print mode. Such optical path branching by the rocking mirror 101 allows a sharp focused image to be obtained on the photosensor array 12, as in the aforementioned reproduction printing.

However, in the conventional configuration as shown in FIGS. 11 and 12, the apparatus becomes inevitably bulky because, in the reader mode, the relatively large scanning case 100 supporting the first and second scanning mirrors 5, 6 has to be retracted from the reader optical path by the rightward movement in the apparatus as shown in FIG. 11 and a large escape space has to be secured for this purpose. Also in case the function for reading the image information is provided by the photosensor array 12, the apparatus becomes bulky and expensive in cost because there are required the rocking mirror 101 for optical path branching and a driving mechanism for said rocking mirror.

SUMMARY OF THE INVENTION

In consideration of the foregoing, the object of the present invention is, in such apparatus as explained above, to achieve compactization of the apparatus by reducing the escape space for the scanning mirrors in the reader mode, and to enable scanning exposure on plural exposure portions with a simple structure.

According to the present invention, there is provided an image exposure apparatus switchable between a reader state in which an image is projected on a screen for observation and a scan state in which said image is exposed by scanning, comprising plural scanning mirrors movable integrally on a same straight line for image scanning, wherein the mutual distances of said plural scanning mirrors are varied at the switching between said reader state and said scan state.

Also the present invention is featured by plural exposure portions to be selectively subjected to scanning exposure, and the mutual distance of plural scanning mirrors is different in respective scanning states for scanning exposure for respective exposure portions.

Also the present invention is featured by having a first scanning case supporting at least a scanning mirror, a second scanning case supporting another scanning mirror, connecting means for connecting said first and second scanning cases, and release means for releasing said connection means, wherein the connection and release of both cases are conducted in relation to the movement of the first scanning case.

The present invention, in the reader mode, maintains the plural scanning mirrors in the reader position with the mutual distance thereof reduced from the predetermined distance in the scanning state, thereby reducing the escape space for said plural scanning mirrors and thus compactizing the apparatus. In the scanning state, the mutual distance of said plural scanning mirrors is varied to the predetermined distance for the scanning state, whereby well-focused sharp exposure can be attained.

Also in case there are provided plural exposure portions to be selectively subjected to scanning exposure, for example a photosensitive member for the print mode and an image sensor for the image reading mode, the mutual distance of the plural scanning mirrors is varied in respective scanning states for scanning exposure on the respective exposure portions, the scanning optical system for the image reading mode can be provided by utilizing that for the print mode without employing the rocking mirror for switching the optical paths, and can attain a same optical path length as in the print mode, whereby scanning exposure can be realized on the plural exposure portions with a simple structure.

DESCRIPTION OF THE PREFERRED EMBODIMENTS

Now the present invention will be clarified in detail by preferred embodiments thereof shown in the attached drawings.

1st Embodiment

Figure 1:
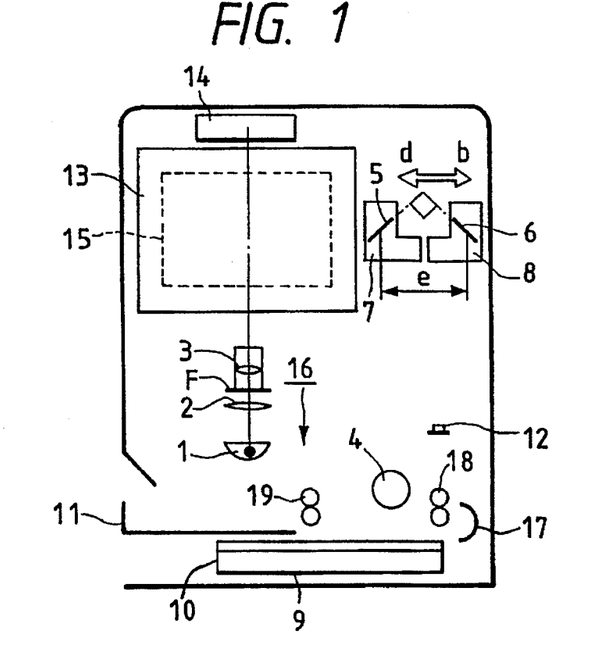
FIG. 1 is a schematic view of the apparatus of a first embodiment in the reader mode.
Figure 2:
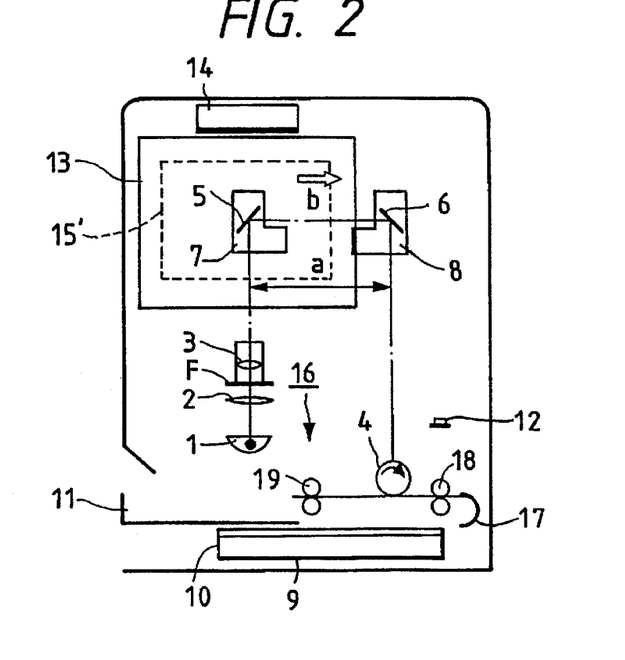
FIG. 2 is a schematic view of said apparatus in the print mode.
Figure 3:
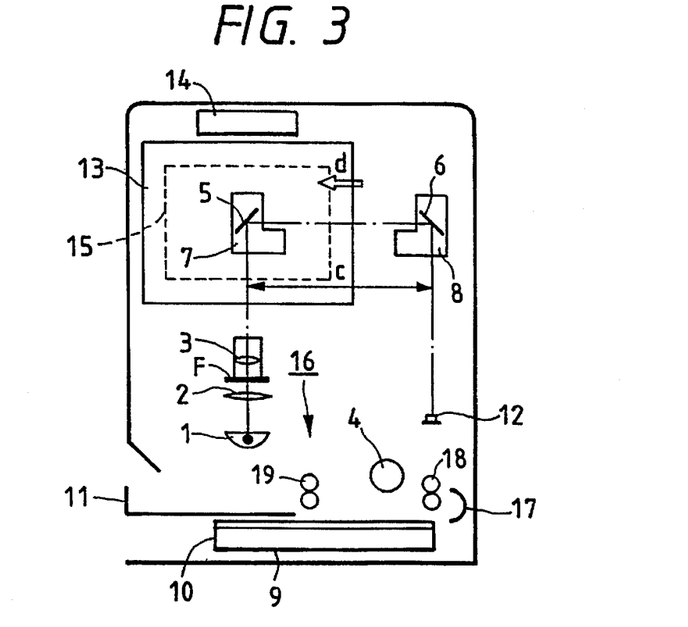
FIG. 3 is a schematic view of said apparatus in the image reading mode.

FIGS. 1, 2 and 3 are schematic views of an apparatus embodying the present invention, respectively in the reader mode, print mode and image reading mode by an image sensor. In these drawings, components the same as those in the aforementioned apparatus shown in FIGS. 11 and 12 are represented by same numbers and will not be explained further.

In the apparatus of the present embodiment, the first and second scanning mirrors 5, 6 are respectively fixed on separate first and second scanning cases 7, 8. As in the apparatus shown in FIGS. 11 and 12, the first and second scanning mirrors 5, 6 are provided in mutually opposed downward positions, respectively inclined by 45° in such a manner that the extensions of the reflecting faces mutually cross perpendicularly. Said first and second scanning cases 7, 8 are driven on a same straight line along an unrepresented lateral guide member, in the forward and reverse directions as indicated by arrows d and b, independently by unrepresented drive means. The first and second reader mirrors 14, 15 and the screen 13 are provided outside the moving path of the first and second scanning cases 7, 8.

(i) Reader Mode (FIG. 1)

In the reader mode, the first and second scanning cases 7, 8 are shifted to the right-hand position in the apparatus by respective drive means and are stopped in the illustrated reader position, with the mutual distance between the first and second scanning mirrors 5, 6 being shortened as indicated by e, whereby said scanning mirrors are retracted from the reader optical path between the projection lens 3 and the first reader mirror 14 of the reader system.

Consequently the reader optical path stays open and, as in the state shown in FIG. 1, the image information of an image frame of the microfilm, placed at the film illuminating position, is projected in magnified manner on the reader screen 13 constituting a first exposure portion.

(ii) Print Mode (FIG. 2)

When the copy button is depressed in the reader mode shown in FIG. 1, the control system of the apparatus is switched to the print mode, whereby the print mechanism 16 is activated. Also the first and second scanning cases 7, 8 effect forward movement d to the left with predetermined speeds by respective drive means controlled by the control means, and the distance of said first and second scanning mirrors 5, 6 is spread to a predetermined distance a for the print mode. By the forward movement d of the first scanning case 7, the first scanning mirror 5 enters the reader optical path, while by the forward movement d of the second scanning case 8, the second scanning mirror 6 becomes positioned above the photosensitive drum 4 of the print mechanism 16.

As the mutual distance between the first and second scanning mirrors 5, 6 is widened to the predetermined distance a for the print mode, the length of the scanning optical path (printer optical path) from the projection lens 3, through the first and second scanning mirrors 5, 6, to the exposure portion of the photosensitive drum 4, constituting a second exposure portion, becomes equal to the length of the reader optical path, in the reader mode, from the projection lens 3 through the first and second reader mirrors 14, 15 to the screen 13.

After the first scanning mirror 5 is inserted into a predetermined position in the reader optical path by the forward movement d of the first scanning case 7, the first and second scanning cases 7, 8 effect a reverse movement to the right with a same speed, thus maintaining said distance a therebetween.

Thus the reader optical path is scanned by the first scanning mirror 5, and thus scanned light is reflected by the first and second scanning mirrors 5, 6 and is focused as a slit on the photosensitive drum 4 constituting the second exposure portion, whereby the print mechanism 16 executes magnified printing of the image information of the image frame of the microfilm F.

Even after the image exposure onto the photosensitive drum 4, the first and second scanning cases 7, 8 continue the reverse movement b to the right and, after the second scanning case 8 returns to the original reader position, the first scanning case 7 continues said reverse movement b thereby reducing the distance to the second scanning case 8, until the original reader position where the distance to the second scanning case 8 is reduced to e, whereupon said reverse movement is terminated to restore the state shown in FIG. 1 and the apparatus returns to the reader mode.

(iii) Image Reading Mode by Image Sensor 12 (FIG. 3)

The image sensor 12 is fixed, with the light-receiving face thereof upwards, in the vicinity of the photosensitive drum 4, but the rocking mirror 101 for switching the optical paths, as shown in FIGS. 11 and 12, is not provided.

From the reader mode shown in FIG. 1, in which the first and second scanning cases 7, 8 are in the reader position, at first the first scanning case 7 effects a forward movement d to the left to enter the reader optical path, thereby switching the reader optical path to the print optical path.

When the distance of the first and second scanning mirrors 5, 6 is widened to a predetermined distance c (≠a) for the image reading mode, the second scanning case 8 effects the same forward movement d with a speed as that of the first scanning case 7, thereby maintaining said distance c thereto.

In this state a scanning operation is executed on the image sensor 12 constituting a third exposure portion. More specifically, the reader optical path is scanned by the first scanning mirror 5, and thus scanned light is reflected by the first and second scanning mirrors 5, 6 and is focused as a slit on the light-receiving face of the image sensor 12 constituting the third exposure portion, whereby the image information of the image frame of the microfilm F is photoelectrically read and processed.

As the distance between the first and second scanning mirrors 5, 6 is widened to the predetermined distance c for the image reading mode, the length of the optical path from the projection lens 3 through the first and second scanning mirrors 5, 6 to the light-receiving face of the image sensor 12 becomes equal to that of the scanning optical path in the print mode. Thus the image sensor 12 is provided, with the light-receiving face thereof upwards, at a position displaced from the exposure portion of the photosensitive drum 4 by a distance (c-a) to the right and by a distance (c-a) above said photosensitive drum 4.

Figure 4:
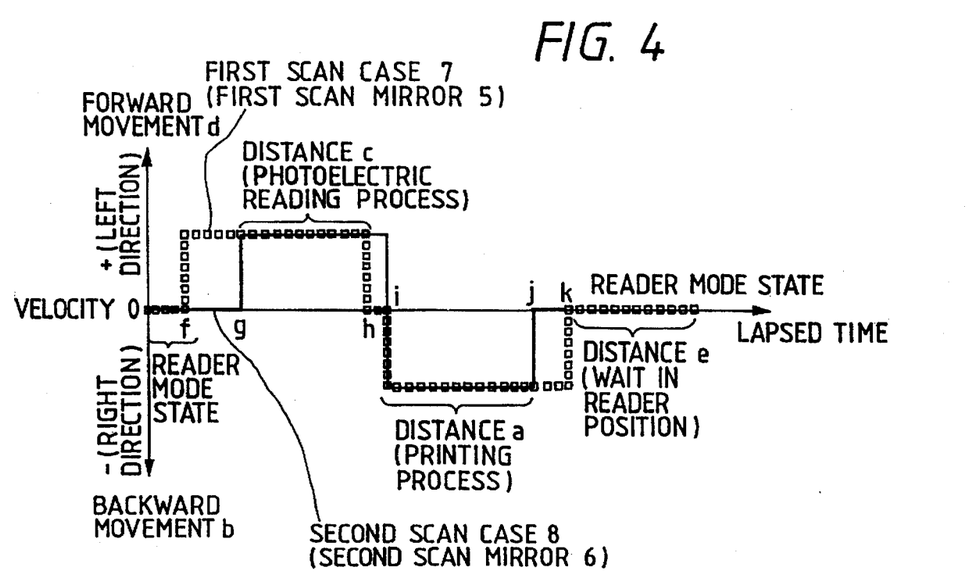
FIG. 4 is a chart showing the variation in the speed in the forward and reverse motions of the first and second scanning cases (first and second scanning mirrors) in the image reading mode and in the print mode in succession.

(iv) Continuous Operation of Image Reading Mode and Print Mode (FIG. 4)

FIG. 4 show the variation in the speeds of the first and second scanning cases 7, 8 (first and second scanning mirrors 5, 6) in such continuous operation, wherein the abscissa indicates the elapsed time while the ordinate indicates the speed, taken as positive or negative respectively in the forward (leftward) movement d and reverse (rightward) movement b, and a broken line and a solid line respectively indicate the speeds of the first and second scanning cases 7, 8.

When the copy button is depressed in the reader mode, in which, as shown in FIG. 1, the first and second scanning cases 7,8 are retracted from the reader optical path and are stopped in the reader position at the right-hand side of the apparatus, at first the first scanning case 7 effects a forward movement d to the left, thus entering the reader optical path and switching the reader optical path to the print optical path. Then, when the distance of the first and second scanning mirrors 5, 6 is extended to c (FIG. 3) at a time g, the second scanning case starts a forward movement d to the left with a speed the same as that of the first scanning case 7.

In this state the scanning exposure is executed on the image sensor 12 constituting the third exposure portion (from g to h). Upon completion of the scanning operation, the first scanning case 7 stops at first (time h) and waits.

Then, when the distance between the first and second scanning cases 5, 6 is reduced to a (FIG. 2), the second scanning case 8 is reversed and starts a reverse movement b to the right (time i). At the same time the first scanning case 7 also starts a reverse movement b to the right with a speed the same as that of the second scanning case 8.

In the state (from i to j), scanning exposure is executed on the photosensitive drum 4 constituting the second exposure portion. In this operation, based on the image information read by the above-mentioned image sensor 12, there are activated known image processing means (not shown) such as image density control means, black frame erasing means and image rotating means, thereby obtaining a desired reproduced print from the photosensitive drum 4. Upon completion of the scanning exposure for the print mode, the second scanning case stops at first (time j), and then the first scanning case 7 also stops (time k) when the distance between the first and second scanning mirrors 5, 6 is reduced to e, whereupon the light is projected on the screen 13 constituting the first exposure portion and the apparatus returns to the reader mode.

In the present embodiment, the image information obtained by the image sensor 12 is utilized as data for image processing in the reproduced printing from the photosensitive drum 4, but such image information may be recorded in a memory such as a magnetooptical disk or transmitted to an external equipment such as a laser beam printer.

In the reader mode, the first and second scanning mirrors 5, 6 are maintained in the reader position as shown in FIG. 1, with a mutual distance e smaller than the distance a in the print mode shown in FIG. 2 or the distance c in the reading mode shown in FIG. 3, whereby the escape space for said scanning mirrors 5, 6 can be reduced in the reader mode and the compactization of the apparatus can be achieved.

Also by varying the distance of the first and second scanning mirrors 5, 6 as a and c in the respective scanning states in the print mode in FIG. 2 and the reading mode in FIG. 3, there can be constructed the scanning optical system for the reading mode, utilizing that in the print mode but without employing the rocking mirror 101, shown in FIGS. 11 and 12, for optical path switching, and with a same optical path length as in the print mode, whereby scanning exposure can be realized on plural exposure portions (photosensitive drum 4 and image sensor 12) with a simple structure.

2nd Embodiment

FIGS. 5 to 8 illustrate a second embodiment of the present invention, wherein the image-bearing light emerging from the projection lens 3 is selectively focused on two exposure portions, i.e. the screen 13 and the photosensitive drum 4.

Figure 5:
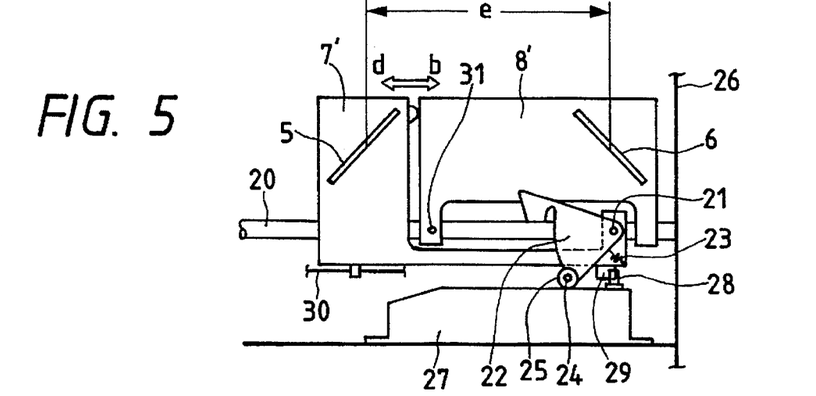
FIG. 5 is a view of the apparatus of a second embodiment, showing a state in which the first and second scanning cases are stopped in a waiting state in the reader position.

FIG. 5 shows the state in the reader mode, in which the first and second scanning mirrors 5, 6 are stopped, with the mutual distance thereof reduced to e, at the reader position at the right-hand side of the apparatus.

First and second scanning cases 7', (8', respectively supporting the first and second scanning mirrors 5, 6, are rendered capable of reciprocating motion in the lateral direction, along a horizontally extending guide rail 20.

The first and second scanning cases 7', 8' are respectively U-shaped in the vicinity of the mounting portions to the guide rail 20, respectively by an upward notch and a downward notch, and are mounted in mutually staggered manner on the guide rail 20. On a shaft 21 protruding at the right-hand side of the first scanning case 7', there is rotatably mounted a connecting arm 22, and a roller 25 rotatably mounted on a shaft 24 provided in the lower portion of said connecting arm 22 rides on a cam member 27 fixed on a frame 26 of the apparatus and is biased downwards by a spring 23.

On the cam member 27 there is provided a photosensor 28, which is interrupted, in the reader mode, by a position detecting plate 29 mounted on the first scanning case 7'. Said first scanning case 7' is reciprocated by a driving wire 30, connected to drive means (not shown).

Figure 6:
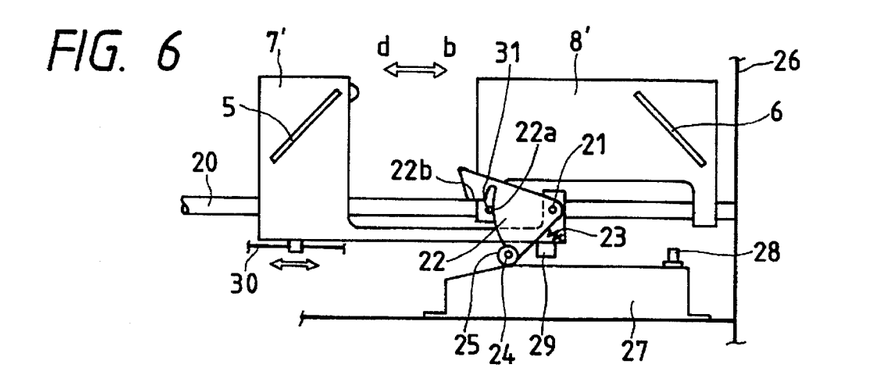
FIG. 6 is a view showing a state in which the first scanning case is in the course of forward movement.

When the copy button (not shown) is depressed in the reader mode shown in FIG. 5, the first scanning case 7' effects the forward movement to the left by the driving wire 30. Along with said forward movement, the roller 25 rolls on the cam member 27, and the connecting arm 22 moves to the left while maintaining its angular position. As a result, the connecting arm 22 impinges on a connecting shaft 31 protruding in the left-hand portion of the second scanning case 8', as shown in FIG. 6.

Figure 7:
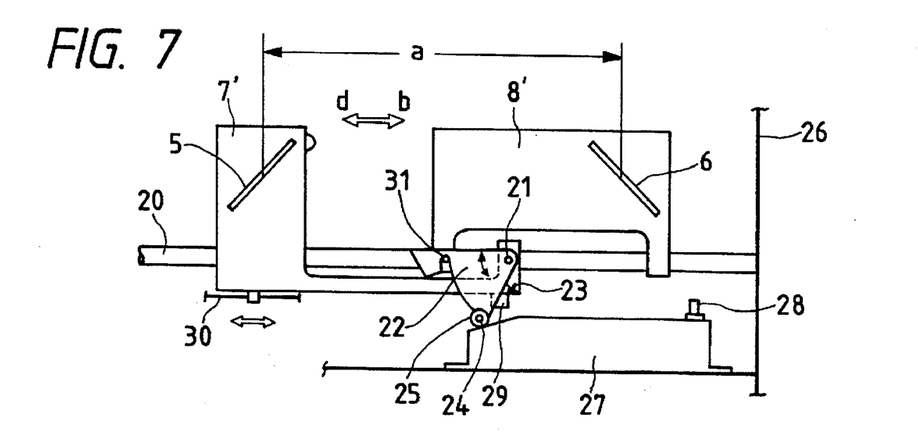
FIG. 7 is a view showing a state in which the first scanning case is further moved in the forward direction and is connected with the second scanning case.

When the roller 25 rolls on a slanted portion of the cam member 27 by the movement of the first scanning case 7', the connecting arm 22 rotates anticlockwise whereby, as shown in FIG. 7, the connecting shaft 31 engages with a fitting portion formed on said connecting arm 22 and the first and second scanning cases 7', 8' are completely connected. In this state the distance between the first and second scanning mirrors 5, 6 becomes equal to the predetermined distance a for the print mode.

At the collision of the connecting arm 22 and the connecting shaft 31, the contact position therebetween varies depending on the positional aberration of the second scanning case 8'.

In case the second scanning case 8' is at the right side at said collision, the connecting shaft 31 comes into contact with a cylindrical surface 22a having the center at the rotary axis 21 of the connecting arm 22, whereby the first scanning case 7' pulls the second scanning case 8' while the roller 25 turns on the slanted face of the cam member 27 whereupon the connecting arm 22 effects rotation to complete the connection.

In case the second scanning case 8' is at the left side at said collision, the roller 25 may start to turn on the slanted face of the cam 27, so that the connecting arm 22 may start rotation, prior to the collision. In such case a face 22b of the connecting arm 22 rides on the connecting shaft 31, thereby suspending the rotation of the connecting arm 22. Then, along with the movement of the first scanning case 7', the face 22b of the connecting arm 22 slides on the connecting shaft 31, and, when the fitting portion is reached, the connecting arm effects rotation to complete the connection. Thereafter the first scanning case 7' starts to pull the second scanning case 8'.

The first and second scanning cases 7', 8', thus connected, further move to the left by the driving wire 30. When it is detected, by the photosensor positioned at the left and the position detecting plate 29, that the first and second scanning cases 7', 8' reach a scanning start position for the photosensitive drum 4, the first and second scanning cases 7', 8' still in the connected state are reversed and start a reverse movement b to the right, thereby effecting scanning exposure to the photosensitive drum 4 in the same manner as in the print mode (FIG. 2) in the aforementioned first embodiment, for providing a reproduction print.

Even after the scanning operation, the first and second scanning cases 7', 8' continue the movement to the right, and they are disengaged through operations inverse to those in the forward movement (in the order of FIGS. 7, 6 and 5). More specifically, the roller 25 rolls up the slanted face of the cam member 27 as shown in FIG. 7, whereby the connecting arm 22 rotates clockwise and is disengaged from the connecting shaft 31 (FIG. 6). At this point the second scanning case 8' stops while the first scanning case 7' alone continues to move to the right and, when the photosensor 28 is interrupted by the position detecting plate 29, the first scanning case 7' is also stopped whereby the reader mode state is restored (FIG. 5).

Figure 8:
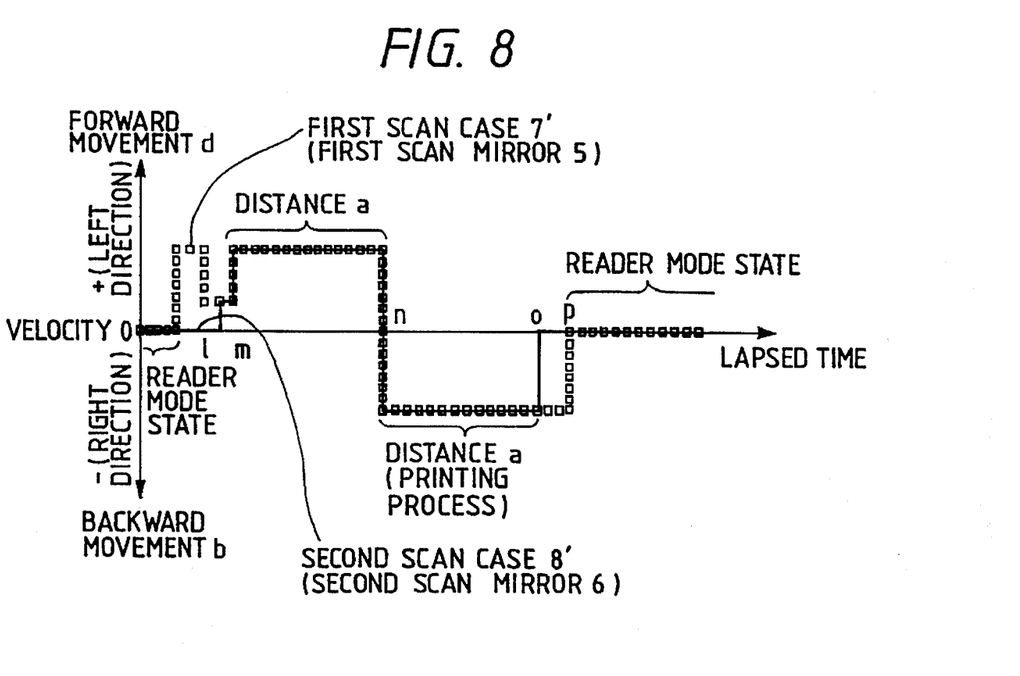
FIG. 8 is a chart showing the variation in the speed in the forward and reverse motions of the first and second scanning cases (first and second scanning mirrors)

FIG. 8 shows the variation in the speeds of the first and second scanning cases 7', 8' in the course of the printing operation, as in the first embodiment.

For the purpose of achieving a securer connection, extended life of the connecting portions and reduction of noise and vibration resulting from the collision, the speed of the first scanning case 7' is lowered in a period around the collision in the forward movement, by detecting a period from l to m with the photosensor. Then the scanning operation on the photosensitive drum 4 is executed in a period from n to o, and the reader mode state is restored from a time p.

Also the detections of the scanning start position and of the period l–m may be achieved for example with an encoder.

3rd Embodiment

Figure 9:
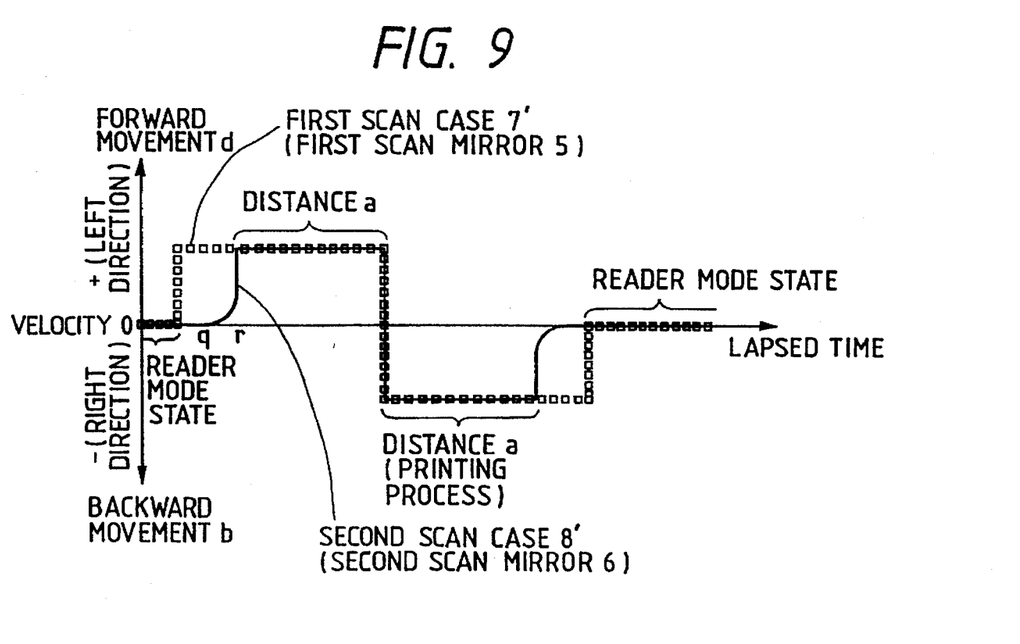
FIG. 9 is a chart showing, in the apparatus of a third embodiment, the variation in the speed in the forward and reverse motions of the first and second scanning cases (first and second scanning mirrors)
Figure 10:
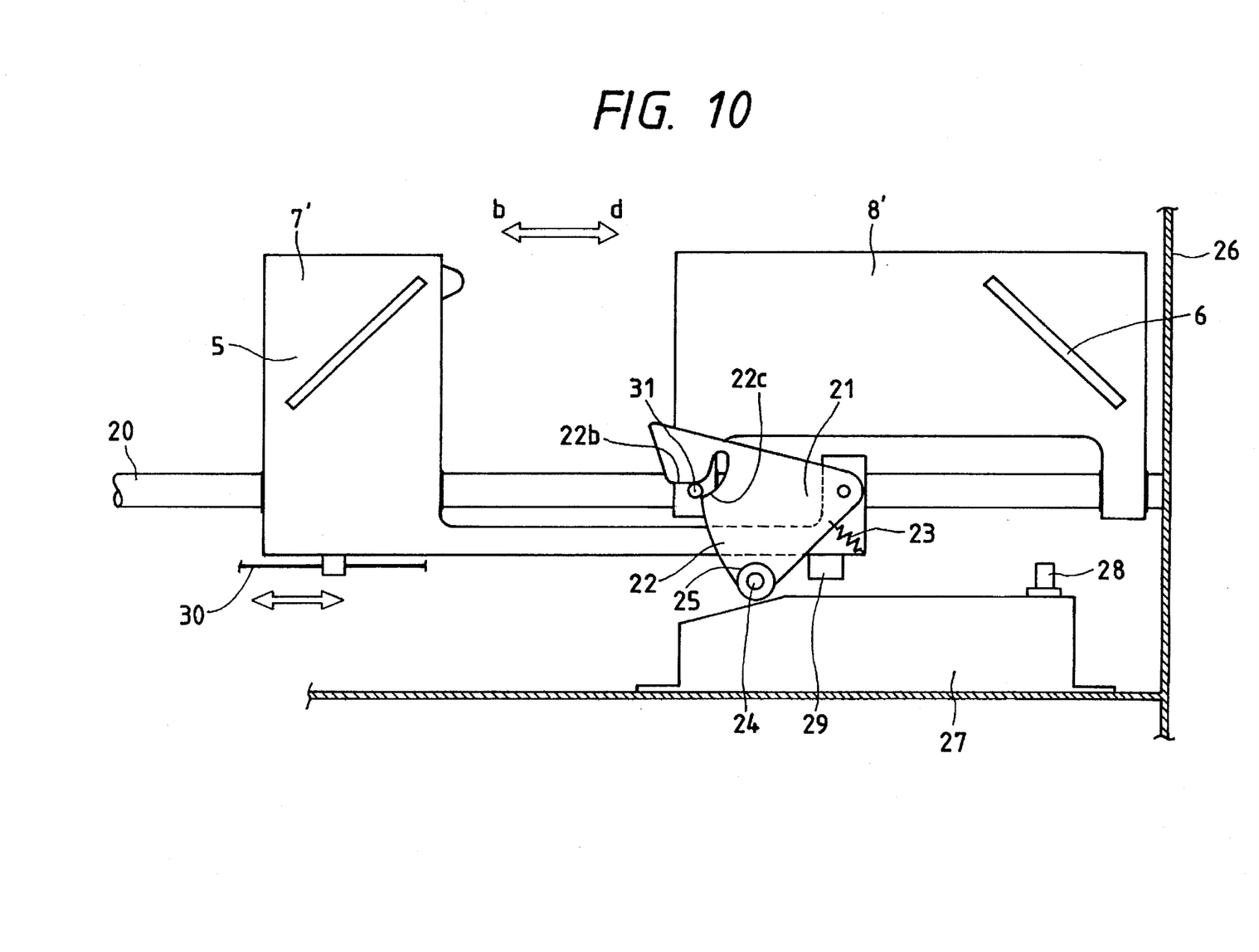
FIG. 10 is a view showing the principal parts of the apparatus of the third embodiment.

FIGS. 9 and 10 show a third embodiment of the present invention. In the foregoing second embodiment, the colliding face 22d of the connecting arm 22 is formed as a cylindrical surface having the center at the rotary axis 21 of the connecting arm 22, but it may also be formed, as shown in FIG. 10, as a slanted curved surface 22c. The variation in the speeds of the first and second scanning cases 7', 8' in this case is shown in FIG. 9. By the use of such slanted curved surface in the connecting surface, the second scanning case 8' (represented by the solid line) is accelerated more gradually in a period from q to r, when pulled by the first scanning case 7' (represented by the broken line), so that the first scanning case 7' need not be decelerated at the collision. It is therefore possible to shorten the connecting time, while achieving a securer connection, improvement in the life of the connecting portions, and reduction in the noise and vibration of collision.

According to the present invention, as explained in the foregoing, in the image exposure apparatus switchable between a reader state in which an image is projected on a screen for observation and a scan state in which said image is subjected to scanning exposure, the escape space for plural scanning mirrors can be reduced in said reader state whereby the entire apparatus can be compactized, and scanning exposure can be made on plural exposure portions with a simple configuration.

What is claimed is:

1. An image exposure apparatus switchable between a reader state in which an image is projected on a screen for observation and a scan state in which said image is subjected to scanning exposure, comprising:

plural scanning mirrors for effecting image scanning by movement on a same line; and variation means for varying the mutual distance of said plural scanning mirrors at the switching between said reader state and said scan state.

2. An apparatus according to claim 1, wherein said plural scanning mirrors expose a photosensitive member to the image.

3. An apparatus according to claim 1, wherein said plural scanning mirrors expose an image sensor to the image.

4. An apparatus according to claim 1, wherein said plural scanning mirrors selectively expose plural exposure portions to the image, and the mutual distance of said plural scanning mirrors is different in respective scan states for exposure to the respective exposure portions.

5. An apparatus according to claim 1, further comprising:

a first scanning case supporting at least a first scanning mirror;

a second scanning case supporting a second scanning mirror;

connection means for connecting said first and second scanning cases; and release means for releasing connection of said first and second scanning cases, wherein the connection and the release are effected in relation to the movement of said first scanning case.

6. An apparatus according to claim 5, wherein the moving speed of said first scanning case is lowered at the connection thereof with said second scanning case.

7. An apparatus according to claim 1, wherein a scanning mirror can enter and be retracted from a reader optical path for projecting the image onto the screen, and the mutual distance of the plural scanning mirrors in which said first scanning mirror is retracted from the reader optical path is shorter than the mutual distance of the plural scanning mirrors in a state in which said first scanning mirror enters the reader optical path.

8. An apparatus according to claim 7, wherein said plural scanning mirrors include two mirrors of which reflecting faces form a mutual angle of 90°.

9. An apparatus according to claim 8, wherein said two scanning mirrors are independently movable.

10. An apparatus according to claim 9, wherein said two scanning mirrors are integrally movable.

11. An apparatus according to claim 8, wherein said two scanning mirrors are switchable between a state capable of movement in mutual connection and a state capable of independent movements without mutual connection.

12. An apparatus according to claim 1, wherein movement of said plural scanning mirrors causes the switch between the reader state and the scan state.

13. A reader-printer comprising:

first optical means for forming a reader optical path for projecting an image of a film onto a screen;

a second optical means for forming a printer optical path for projecting the image of the film onto an exposure portion, wherein said second optical means includes plural scanning mirrors capable of reciprocating motion in a same direction to effect scanning exposure of the image of the film on the exposure portion; and variation means for varying the mutual distance of said plural scanning mirrors in a reader mode and in a printer mode.

14. A reader-printer according to claim 13, wherein the mutual distance of said plural scanning mirrors is shorter in the reader mode than in the printer mode.

15. A reader-printer according to claim 13, wherein said second optical means includes first and second scanning mirrors, with at least said first scanning mirror capable of entering and being retracted from the reader optical path.

16. A reader-printer according to claim 15, wherein the mutual distance of said two scanning mirrors in a state in which said first scanning mirror is retracted from the reader optical path is shorter than that in a state in which said first scanning mirror enters the reader optical path.

17. A reader-printer according to claim 13, wherein a photosensitive member is provided at the exposure portion.

18. A reader-printer according to claim 13, wherein an image sensor is provided at said exposure portion for reading the image of the film.

19. A reader-printer according to claim 13, wherein a photosensitive member is provided at a first position of the exposure portion and an image sensor is provided at a second position different from the first position, and the mutual distance of said plural scanning mirrors at the exposure of the photosensitive member to the image is different from that at the exposure of the image sensor to the image.

20. A reader-printer according to claim 13, wherein said plural scanning mirrors are switchable between a state capable of integral movement and a state capable of independent movement.

21. A reader-printer according to claim 20, further comprising:

connection means for connecting the plural scanning mirrors; and release means for releasing the connection.

* * * * *

UNITED STATES PATENT AND TRADEMARK OFFICE
CERTIFICATE OF CORRECTION

PATENT NO. : 5,642,181
DATED : June 24, 1997
INVENTOR(S) : Matsumoto et al.

It is certified that error appears in the above-identified patent and that said Letters Patent is hereby corrected as shown below:

COLUMN 7:

Line 36, "(8'," should read --8',--

COLUMN 10:

Line 27, "the" (first occurrence) should read --said--.

Signed and Sealed this

Nineteenth Day of May, 1998

Attest:

BRUCE LEHMAN

*Attesting Officer*     *Commissioner of Patents and Trademarks*